United States Patent [19]

Ibenthal

[11] Patent Number: 5,153,719
[45] Date of Patent: Oct. 6, 1992

[54] METHOD OF DETECTING HORIZONTAL MOVEMENTS IN THE PICTURE CONTENTS OF A TELEVISION SIGNAL

[75] Inventor: Achim Ibenthal, Elmshorn, Fed. Rep. of Germany

[73] Assignee: U.S. Philips Corporation, New York, N.Y.

[21] Appl. No.: 747,215

[22] Filed: Aug. 19, 1991

[30] Foreign Application Priority Data

Aug. 22, 1990 [DE] Fed. Rep. of Germany ....... 4026511
Oct. 9, 1990 [DE] Fed. Rep. of Germany ....... 4031921

[51] Int. Cl.⁵ .............................................. H04N 7/13
[52] U.S. Cl. ...................................... 358/105; 358/136
[58] Field of Search ................................. 358/105, 136

[56] References Cited

U.S. PATENT DOCUMENTS 4,774,574 9/1988 Daly ..................................... 358/133
5,012,329 4/1991 Lang ..................................... 358/31

FOREIGN PATENT DOCUMENTS 0348320 12/1989 European Pat. Off. .

OTHER PUBLICATIONS

Search Report.

*Primary Examiner*—Howard W. Britton
*Attorney, Agent, or Firm*—Michael E. Marion

[57] ABSTRACT

A method and apparatus for detecting horizontal movements in the picture contents of a television signal wherein edges are detected in the scanning lines by comparing the pixel values of successive pixels, and a displacement vector indicating the horizontal displacement of the edge is determined for each detected edge by comparing the location of the detected edges in successive frames or fields.

21 Claims, 2 Drawing Sheets

METHOD OF DETECTING HORIZONTAL MOVEMENTS IN THE PICTURE CONTENTS OF A TELEVISION SIGNAL1076

BACKGROUND OF THE INVENTION

The invention relates to a method of detecting horizontal movements in the picture contents of time-sequential frames or fields composed of scanning lines of a picture signal.

If, for example, the transmission standard of a television signal is changed, or if several methods of improving the picture quality of a television signal are used, it is necessary to have information about the location of movements in areas of a picture and about the extent of these movements. This problem occurs in a stronger form in a television signal whose frames are formed as two successive fields generated in accordance with the interlaced scanning mode, because these two fields represent different movement phases of one possible movement. For example, if the vertical frequency of the television signal is doubled to suppress the large-area flicker, new pictures must be generated between the available fields of the television signal. If a movement which is possibly present in the pictures of the television signal is to be displayed correctly, it is necessary for generating the new pictures to know in which areas of the picture contents of the pictures a movement takes place and to what extent this movement takes place.

There are different methods of detecting movements in the picture contents of frames or fields of a television signal which generally operate two-dimensionally, i.e. they detect vertical as well as horizontal movements in the picture contents. These methods are generally very elaborate and therefore uneconomical, particularly for use in television receivers for consumer use.

SUMMARY OF THE INVENTION

It is an object of the invention to provide a method of the type described in the opening paragraph with which horizontal movements can be detected in the picture contents. Moreover, it should be possible to carry out the method by means of the simplest arrangements as possible.

According to the invention this object is solved in that edges are detected in the scanning lines by comparing the pixel values of successive pixels, a displacement vector indicating the horizontal displacement of the edge is determined for each detected edge by comparing the location of the detected edges in successive frames or fields.

The method can be used both for television signals, in which complete frames are successively transmitted without interlacing, and for television signals in which a frame is composed of two successively transmitted fields generated in accordance with the interlaced scanning mode. As explained above, a detection of the movements is very interesting, particularly for the last-mentioned television signals. The process steps further explained hereinafter relate to time-sequentially transmitted frames or fields. Television signals of the first-mentioned type thus relate to time-sequentially transmitted frames, whereas in television signals of the second type time-sequential fields are utilized for performing the method. The following description will only relate to successive fields of a television signal, but the method can also be used in an unlimitative way for television signals transmitted in frames.

To detect horizontal movements in the picture contents of the fields of a television signal a detection of edges is initially performed in each scanning line of each field. Edges in the television signal are detected by comparing the pixel values of successive pixels within each scanning line. It is evident that there is an edge when pixel values of adjacent pixels considerably differ from each other. If in a field N an edge is detected in a given position within a given scanning line, it is attempted to find the previously detected edge again in the subsequent field in the same scanning line. If an edge is detected in a similar area of pixels within the same scanning line of the second field, it is ascertained whether the edge has moved or by which value the edge has moved. If a movement of the edge is detected, a displacement vector is generated which indicates the extent of the horizontal movement of the edge and thus indicates by how many pixels the edge has moved in the same scanning line between the two consecutive fields.

This displacement vector is then suitable for the further signal processing, i.e. it can be utilized, for example, to detect the position of the edge for which the displacement vector is valid in a new field, which is generated with respect to time between the two fields from which the displacement vector was determined. Furthermore, the displacement vectors found can be utilized for reducing the flicker which is produced along edges extending in the scanning line direction due to the interlace in a television signal generated in this mode.

In an embodiment of the invention
the validity of each displacement vector is checked by comparing the pixel values of a plurality of pixels located behind the associated edge,
a candidate vector is filtered from a plurality of successive displacement vectors for which this check has yielded a positive result, and
for each pixel of a scanning line of a frame or a field it is separately checked whether there is a movement in accordance with one or a plurality of candidate vectors or whether there is no movement of the pixel by comparing the value of the pixel with the value of the pixel displaced by the candidate vector and the value of the pixel having the same position in the subsequent frame or field.

To ensure that a displacement vector found is not an accidental result which may have been caused, for example, by interference or noise, the validity of each displacement vector is checked. This is effected by comparing the pixel values of a plurality of pixels behind the detected edge in the two fields. In fact, if an edge has actually moved between the two fields, this is also true of the subsequently transmitted pixels which are located to the right of the edge in the case of normal display. The values of the pixels behind the edge should thus be similar in the two fields, also when the edge or the pixels have been displaced. Only if this is the case is it assumed that an edge which has actually moved is detected. A candidate vector is then filtered from a plurality of successive displacement vectors, i.e. a plurality of time-sequentially determined displacement vectors. This means that the values of a plurality of time-sequential displacement vectors are compared with each other and that, for example, a kind of mean value is utilized as a candidate vector.

This candidate vector now quasi-indicates the extent of an expected movement. However, this movement should not necessarily apply to all pixels of a field or of subsequent fields. Therefore, it is checked for those frames or fields or for those individual scanning lines of the frames or fields whether the candidate vector(s) found indicate a movement which actually relates to the individual pixel. To this end at least two comparisons are made for each pixel. This is realised in that the value of one pixel, for which the correctness of a determined candidate vector is to be checked, is compared with the corresponding pixel of the subsequent field. The corresponding pixel is located in the second field on the same scanning line, but is displaced by the candidate vector. Furthermore, a second check is carried out in which the relevant pixel is compared with the pixel having the same position within the same scanning line of the subsequent field. It is evident that the first comparison will show whether the relevant pixel displaced by the candidate vector appears again in the second field on the same scanning line and that the second comparison shows whether the pixel may not have moved between the two fields. These comparisons make it possible to determine for each pixel whether it is subjected to a horizontal movement in accordance with the candidate vector(s).

As has been stated, one or more candidate vectors can be determined for checking the pixels of a scanning line. These candidate vectors can generally only be determined at the end of a line and can thus be utilized at the earliest for the subsequent line for the above-mentioned comparisons. Moreover, it is also possible to use the candidate vectors for corresponding or similarly arranged lines of subsequent frames or fields.

The method can be realised by means of circuit arrangements which have such a size that they are, for example, fully integrable in an IC and thus permit of an economical use, also for consumer apparatuses.

As already explained hereinbefore, the candidate vectors found can be used for different ranges of subsequent lines or also fields. To permit an even more secure movement prediction by means of the candidate vectors, it has proved to be advantageous to re-filter the candidate vectors filtered from the displacement vectors. An embodiment of the invention is therefore characterized in that the candidate vectors filtered from the displacement vectors are subjected to a post-filtering treatment and that a post-filtered candidate vector is filtered from the candidate vectors determined for the same scanning lines of at least two successive frames or fields. As it can generally be assumed that the same scanning lines of consecutive fields also have similar picture contents, the movement in the same lines of the two fields should also be similar. It is therefore advantageous to subject the candidate vectors of these lines once more to a post-filtering treatment. This post-filtering treatment may again be a kind of averaging. In this way the predictability of the candidate vectors is further enhanced.

In accordance with a further embodiment of the invention exactly one candidate vector is filtered from the three last-determined displacement vectors for each scanning line of a frame or field, which candidate vector in its turn is subjected to the post-filtering treatment.

The candidate vectors are filtered from the displacement vectors in such a way that exactly one candidate vector is determined for each scanning line. To this end the last-determined three displacement vectors are utilized at the end of each scanning line. These three displacement vectors may not necessarily have been determined in this line, but they may also be the displacement vectors of a previous scanning line if, for example, no displacement vector was determined in the relevant line. In any case the three displacement vectors which were the last to be determined with respect to time are filtered out for determining a candidate vector. This filtering treatment also provides the advantage that the candidate vector obtained is most unlikely produced by interference. A possibly false displacement vector will therefore hardly occur in the final result.

In a further embodiment of the invention the candidate vectors of the same lines of three successive frames or fields are utilized for post-filtering. The above-described post-filtering of the candidate vectors from candidate vectors determined for the same scanning lines of successive frames or fields can be performed particularly for three candidate vectors of three successive frames or fields. A satisfactory compromise between a sufficiently quick reaction of candidate vectors to changed movements and a sufficient freedom from interference is achieved. In a further advantageous embodiment of the invention the filtering of the displacement vectors and/or the post-filtering of the candidate vectors is a median filtering. A median filtering is advantageous both for filtering out the displacement vectors so as to gain a candidate vector and for filtering a plurality of candidate vectors so as to post-filter and obtain a filtered candidate vector, because in median filtering the mean value is derived as a filter value from a plurality of successive values, for example, from three values. Consequently, the filtering result does not show any "stray" values.

Based on the stepped filtering of the candidate vector from the displacement vectors and the subsequently performed post-filtering of the candidate vectors, such a finally post-filtered candidate vector is present at the earliest at the end of the scanning line of the frame in which the last candidate vector of the filtering result was determined. For this reason the post-filtered candidate vector may be utilized at the earliest from this instant for the pixel-by-pixel check of a movement which, in accordance with the candidate vector, is actually present. The candidate vector is thus actually available too late in the relevant frame. It is therefore advantageous to use the candidate vector in a scanning line of a subsequent field. According to an advantageous embodiment the post-filtered candidate vector for the pixels of a scanning line is used to check whether there is a movement in accordance with this candidate vector or whether there is no movement and that this scanning line is comprised in the frame or field which time-sequentially follows the frames or fields for which the candidate vectors were determined and from which vectors the post-filtered candidate vector has resulted.

Since filtering of the post-filtered candidate vectors covers a plurality of lines, its value will be basically related to an average value of the three previous lines. For this reason it is advantageous to utilize the post-filtered candidate vector in the subsequent field for lines which are located before the line for which the candidate vector itself was determined. To this end an embodiment of the invention is characterized in that the post-filtered candidate vector is utilized for the pixel-by-pixel check of that scanning line of the subsequent frame or field which is located three lines before the scanning lines of the previous frames or fields for which the candidate vectors were determined and from which vectors the post-filtered candidate vector has resulted.

In a further embodiment of the invention the check to be carried out for each pixel of a scanning line of a frame or a field on whether there is a movement in accordance with one or more candidate vectors or whether there is no movement of the pixels by comparing the value of the pixel with the value of the pixel displaced by the candidate vector and of the pixel having the same location of the subsequent frame or field is realised in such a way that the results of the check for a predeterminable number of pixels, half of which are located before and after the pixel to be checked on its movement in the scanning line, are separately added for both checks and in that the decision whether the possibly post-filtered candidate vector is valid or not valid for the checked pixel is taken in dependence upon the value of this sum. Also when the possibly post-filtered candidate vector was determined accurately and has a correct value, the pixel-by-pixel checks described hereinbefore may lead to erroneous results. Therefore, it is advantageous to add the checks or the results of the checks of a plurality of successive pixels and to declare the candidate vector valid or invalid jointly for these pixels in dependence upon the value of the sum. In this way the influence of possible picture noise or picture interference is distinctly reduced.

It has proved to be particularly advantageous that in accordance with further embodiments of the invention the candidate vector for the checked pixel is only valid when a movement in accordance with the candidate vector is more frequently determined for the predeterminable number of pixels than no movement and/or that the candidate vector for the checked pixel is only valid when a movement in accordance with the candidate vector was determined for at least half the predeterminable number of checked pixels. Furthermore, the candidate vector should indicate a movement of at least three pixels per frame or field, because a movement below this value cannot be evaluated in most cases, i.e. particularly a differentiation between a movement in accordance with the vector and no movement will be difficult, and because the probability of interference increases for smaller values. Therefore, according to a further embodiment, the candidate vector for the checked pixel is only valid when the candidate vector itself exceeds a predeterminable minimum value, the minimum value being preferably equal to a movement of two pixels per frame or field.

In accordance with a further embodiment of the invention the predeterminable number of pixels is larger than 7 and smaller than 25.

The predeterminable number of pixels for which the check results are added together and for which a common decision about the validity or invalidity of the candidate vector(s) is taken is preferably within this range because on the one hand the movement of relatively small objects should be recognized correctly and on the other hand this decision should be recognized with sufficient certainty.

As already explained hereinbefore the validity of each displacement vector determined is to be checked by comparing the pixel values of a plurality of pixels located behind the associated edge. This can be effected advantageously in that the validity of each displacement vector is checked by adding the values of eight pixels which are located in the two frames or fields behind the detected edge and by comparing the values of the two sums. Here again a satisfactory immunity from interference is achieved by comparing the sum values of the eight pixels.

The detection of edges within the scanning lines may advantageously be realised in accordance with a further embodiment of the invention in that the pixel values of successive pixels in the scanning lines for detecting the edges are compared by subtracting the pixel values, an edge being only detected when this difference exceeds a threshold value varied in dependence upon the modulation depth of the television signal.

In this case it is particularly important that the threshold value tracks the modulation depth of the television signal. Thus, the detection sensitivity can be adapted to the television signal itself. On the other hand, relatively weakly formed edges and thus also most disturbances are not detected as edges in dependence upon the modulation depth.

The tracking of the threshold value can particulary be adapted for each scanning line. To this end a further embodiment is characterized in that the threshold value has half the value of the maximum pixel value of the previous scanning line.

If an edge is detected, recognition of the edge is aimed at in the same scanning line of the subsequent frame or field. Edges recognized in this scanning line can only be associated with the edge previously detected in the previous frame or field in the same scanning line if these edges are sufficiently similar to one another. To this end it has proved to be advantageous that the edge is recognized in the same line of the subsequent frame or field only when the difference value determined for this edge deviates by a maximum value of ¼ of the maximum pixel value of the previous scanning line from the difference value determined for the edge in the same scanning line for the other frame or field. Also for this recognition of the edge the modulation depth is used, i.e. the smaller this modulation depth, the more precise the recognized edge should correspond in value to the previously recognized edge.

As described hereinbefore, a candidate vector which has been determined and possibly post-filtered is checked pixel by pixel on whether there is actually a movement corresponding to its value. As a complete identity will seldom be achieved in this case, a tracking threshold value dependent on the picture contents is also used for this comparison. However, in this case it is advantageous to utilize the vertical and horizontal local frequency of the picture contents for varying the threshold value. For relatively high local frequencies the threshold value can be increased, i.e. the movement which is actually present may deviate from the movement predetermined by the candidate vector by an amount which is higher as the local frequency of the picture contents is higher.

A further embodiment of the invention for television signals which have fields generated in accordance with the interlaced scanning mode is characterized in that a vertical filtering, preferably a median filtering is performed in one of two successive fields before detection of the movement.

If there are fields generated in accordance with the interlaced scanning mode, the picture contents of these fields are quasi-interleaved in the vertical direction, i.e. also the same scanning lines of the two fields do not represent the same picture contents. In order that this effect is at least reduced, it is therefore advantageous to subject one of two successive fields to a vertical filtering.

For converting a television signal from one transmission standard to another transmission standard or for generating additional fields, for example, for doubling the vertical frequency of the television signal, new frames or fields should be generated each time. Particularly when these fields are generated in accordance with the interlaced scanning mode there is the problem that they represent different phases of movement and that the new fields to be generated should represent the movement correctly. Thus it must be known which picture contents move to what extent. The method according to the invention can be used to advantage for this purpose.

For television signals which have fields generated in accordance with the interlaced scanning mode there is the additional problem that edges extending in the scanning line direction move to and fro due to this interlaced scanning mode. Therefore, methods are known to suppress this interlace flicker. However, here again it is also necessary to know which ranges of the picture comprise moved contents. The method according to the invention can also be used to advantage in this case.

BRIEF DESCRIPTION OF THE DRAWINGS

The invention will now be described in greater detail by way of example with reference to the accompanying drawings in which

FIG. 1 shows a block diagram of an arrangement for performing the method. The arrangement is preceded by a memory arrangement 1 which receives a luminance signal Y forming part of a digital color television signal.

Figure 1:
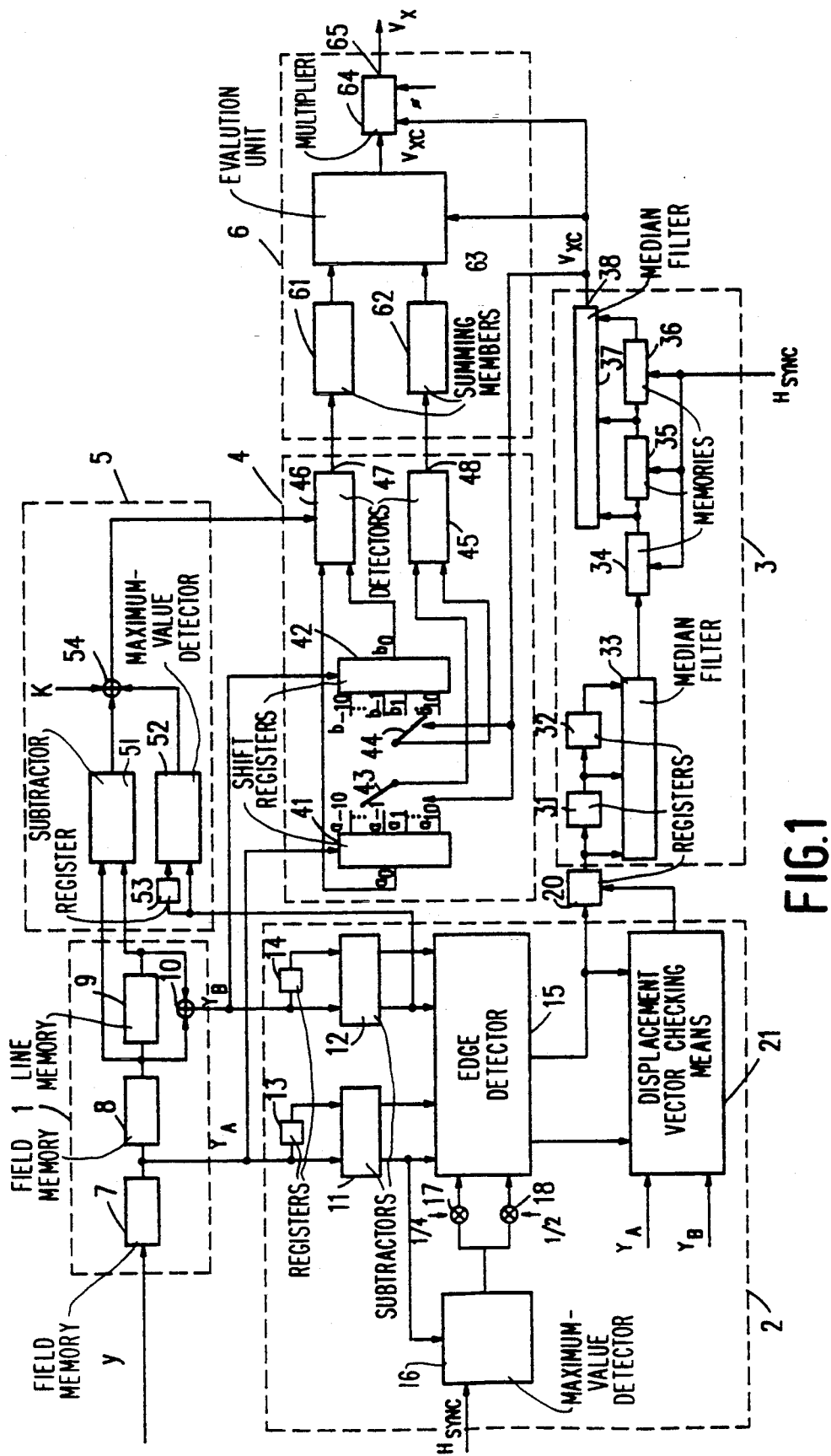
FIG. 1 shows an arrangement for performing the method and a preceding memory arrangement.

The arrangement for performing the method is essentially divided into five circuit blocks, namely a circuit 2 for determining and checking a displacement vector, a filter circuit 3, a circuit 4 for checking the candidate vector, a circuit 5 for threshold adaptation and a circuit 6 for taking validity decisions.

The memory arrangement 1 comprises a first field memory 7 which receives the digital luminance signal Y and is followed by a second field memory 8. A line memory 9 is arranged subsequent to the output of the second field memory 8. The output signal of the second field memory 8 and the output signal of the line memory 9 are applied to inputs of an adder 10. As the luminance signal Y is a signal generated in the interlaced scanning mode, i.e. in which two successive fields constitute one frame, a vertical interpolation of two adjacent scanning lines is performed by means of the arrangement consisting of the line memory 9 and the adder 10. To obtain a correct absolute value of the interpolated signal, it may be multiplied by a factor $\frac{1}{2}$ in a manner not shown in the Figure. The luminance signal $Y_B$ is available at the output of the adder 10, which signal represents the vertically interpolated luminance signal of a field. The luminance signal $Y_A$ is available at the output of the first field memory 7, which signal represents the non-interpolated luminance signal of the previous field. Thus, the luminance signals $Y_A$ and $Y_B$ represent the luminance signals of successive fields.

These two luminance signals $Y_A$ and $Y_B$ are applied to inputs of subtractors 11 and 12, respectively. The luminance signal delayed by one clock, i.e. one pixel, by means of a register 13, 14 is applied to the other inputs of the subtractors 11 and 12. Thus, the values of successive pixels are continuously available for the subtractors 11 and 12. The difference of these successive pixels as well as of the sign of this difference is formed in these subtractors 11 and 12 and is applied to an edge detector 15. In the edge detector 15 edges are detected in the two fields based on the values supplied by the subtractors 11 and 12, the magnitude of the differences being evaluated. An edge is only detected when the difference values exceed a given threshold value. The magnitude of this threshold value is generated in dependence upon the modulation depth of the previous scanning line of the television signal. To this end a maximum-value detector 16 is provided which supplies the maximum pixel value of the previous scanning line. This maximum pixel value is applied to a multiplier 17 and to a further multiplier 18. In the multiplier 18 this maximum value is multiplied by the factor $\frac{1}{2}$ and applied to the edge detector 15. The output signal of the multiplier 18 represents the threshold value which must be exceeded for the detection of an edge in the edge detector 15. The difference value should thus exceed half of the maximum picture value of the previous scanning line. If this is the case, an edge is detected in the luminance signal $Y_A$ and the luminance signal $Y_B$ by means of the edge detector 15. This detection first takes place in the luminance signal in which the edge occurs first. If such an edge has been detected, a counter, which is not further shown in the Figure, in the edge detector 15 is started, which counter continues to count until the same edge is again detected in the other luminance signal. To recognize the edge, the difference value now determined may deviate by $\pm\frac{1}{4}$ of the value supplied by the maximum-value detector 16 from the difference value first determined for the edge. The corresponding tolerance values are supplied by the multiplier 17 in which the maximum value is multiplied by the factor $\frac{1}{4}$. The difference value of the recognized edge may thus deviate by a maximum of $\pm\frac{1}{4}$ from that of the originally detected edge. If this condition has been fulfilled, the edge in the other field is recognized and the counter in the edge detector 15 is stopped. The count is a measure of the number of pixels by which the edge has shifted. In this case a displacement vector which has been determined is concerned. This displacement vector is applied to a register 20 and to an arrangement 21 for checking the displacement vector. The arrangement 21 comprised in the circuit 2 for checking the displacement vector forms, behind a detected edge, the sum of eight subsequent pixels in the two fields. These two sums are compared with each other. If the difference between these two sums falls below a predeterminable threshold value, it can be assumed that the displacement vector has been determined correctly. The arrangement 21 then supplies a corresponding enable signal to the register 20 so that the valid displacement vector appears at its output.

The register 20 is followed by a filter circuit 3 in which the output signal of the register 20 is applied to a further register 31 which is followed by a further register 32. A new value is entered into the registers 31 and 32 whenever a new displacement vector is available. The outputs of the registers 20, 31 and 32 are connected to a median filter 33. These signals are thus the three displacement vectors which were the last to be determined with respect to time. In the median filter 33 these three displacement vectors are filtered for gaining a candidate vector. This filtering is performed at the end of a scanning line so that a new candidate vector is each time available at these instants. The median filtering means that the middle value is selected from the three values. Thus, the initially unfiltered candidate vector is available at the output of the median filter 33.

However, in the filter circuit 3 these candidate vectors are further post-filtered. This circuit comprises three successively arranged memories 34, 35 and 36. In these memories the candidate vectors supplied by the median filter 33 are delayed by each time one field period. Thus, the candidate vectors determined in the same scanning line of three successive fields are available at the outputs of the three memories 34, 35 and 36. These output signals are applied in the filter circuit 3 to a further median filter 37 in which these three candidate vectors are median-filtered. Thus, after this filtering operation a post-filtered candidate vector is available at the output 38 of the median filter 37, which post-filtered candidate vector is utilized for checking the actual movement.

This post-filtered candidate vector is denoted by $v_{xc}$ in the Figure.

The circuit 4 for checking the candidate vector comprises a first shift register 41 to which the luminance signal $Y_A$ is applied and a second shift register 42 to which the luminance signal $Y_B$ is applied. These shift registers 41 and 42 are capable of storing, in succession, the pixel values of 21 pixels. The shift registers 41 and 42 have 21 outputs so that each pixel value can be accessed any time. In the Figure these outputs are denoted by $A_{-10}$ to $A_{10}$ and $B_{-10}$ to $B_{10}$. In the circuit 4 for checking the candidate vector it is now individually checked for each pixel of a scanning line of a field whether the pixel moves in accordance with the post-filtered candidate vector or whether there is no movement in this pixel. Based on the time delay obtained by means of the circuits 2, 3 and 4 this is effected in such a way that the post-filtered candidate vector $v_{xs}$, whose determination has been explained hereinbefore, is used for checking the movement of pixels comprised in the field which follows the three fields from whose unfiltered candidate vectors the post-filtered candidate vector was gained. Within this subsequent field the post-filtered candidate vector is used for checking pixel values located within this field three lines before the lines whose candidate vectors were determined in the previous fields. This relationship will be further explained with reference to FIG. 2.

The candidate vector available at the output 38 of the median filter 37 is applied to switches 43, 44 whose position is varied in dependence upon the value of the post-filtered candidate vector $v_{xc}$. These switches 43 and 44 are used for access from the taps of the shift registers 41 and 42 to those pixel values which in accordance with the determined post-filtered displacement vector $V_{xc}$ correspond to each other. Thus, there is access to those pixels in the equal scanning lines of successive fields which in accordance with the post-filtered candidate vector $V_{xc}$ should be equal in the case of a movement. If the post-filtered candidate vector indicates, for example, a displacement by ten pixels, there is access via the switches 43 and 44 to pixel values in the two fields which are spaced apart by this displacement vector.

The circuit 4 includes a detector 45 by means of which it is determined whether there is actually a movement in accordance with the determined post-filtered candidate vector $V_{xc}$. To this end the detector 45 receives, via the correspondingly controlled switches 43 and 44, those pixels from the shift registers 41 and 42 which are shifted within the relevant scanning line by a value in accordance with the displacement vector. The difference between these two values is formed in detector 45.

Furthermore, there is provided a further detector 46 which is fixedly connected to the central tap of the two shift registers 41 and 42. Thus, pixels having the same position within the scanning lines of the two fields are compared with each other. In this way it is determined whether there is possibly no movement. For this purpose the difference between the two supplied pixel values is also generated in the detector 46.

Both in the detector 45 and in the detector 46 the determined difference values are compared with threshold values. These threshold values are varied in dependence upon the spatial frequency of the television signal. To this end a circuit 5 for adapting the threshold value is provided, which circuit comprises a subtractor 51 to which the output signal of the second field memory 8 and that of the line memory 9 are applied. In this subtractor the difference of those pixels which have the same position in adjacent scanning lines is supplied. This difference is a measure of the vertical spatial frequency. In a maximum-value detector 52 further provided in the circuit 5 the horizontal spatial frequency is determined. This is effected in that the maximum-value detector receives atone input the difference signal of two adjacent pixels in the same scanning line, which signal has already been determined by the subtractor 12. By means of a register 53 this signal is delayed once more and applied to the other input of the maximum-value detector 52 in which the maximum value of these two successive difference values is formed. This signal is a measure of the horizontal spatial frequency. The signals supplied by the subtractor 51 and the maximum-value detector 52 are applied to an adder 54 in which these signals are added. A constant factor k is also added to this sum. The output signal of the adder 54 now represents a threshold value which is varied in dependence upon the vertical and horizontal spatial frequencies. This threshold value is applied to the detector 46. In the detector 46 it is then determined that there is no movement when the difference formed is lower than or equal to this threshold value. The output 47 of the detector 46 then supplies a corresponding output signal.

The threshold value signal supplied by the adder 54 is also applied to the detector 45 in which a movement in accordance with the post-filtered candidate vector $v_{xc}$ is determined when the difference between the two pixel values applied thereto is smaller than or equal to the threshold value signal. If this should be the case, the detector 45 supplies a corresponding output signal at its output 48.

In summary it can be ascertained that the detector 46 supplies an output signal for a given pixel when this pixel has had no movement between the two fields. However, if the pixel has had a movement in accordance with the post-filtered candidate vector $v_{xc}$, the detector 45 supplies a corresponding signal at its output for this pixel.

These output signals of the detectors 45 and 46 already indicate a possibly detectable horizontal movement. However, to make this result more reliable, particularly as regards interference, the circuit 4 is followed by a circuit 6 for taking validity decisions in which circuit 6 these output signals of the detectors 45 and 46 are post-processed once more.

The output 47 of the detector 46 is connected to a summing member 61 in which the output signals of the detector 46 are added for 21 successive pixels. In a corresponding manner the output 48 of the detector 45 is connected to a summing member 62 in which the output signals of the detector 45 are also added for 21 successive pixels. The sum signals supplied by the summing members 61 and 62 are applied to an evaluation and decision unit 63. In this evaluation unit 63 a decision relating to the validity of the post-filtered displacement vector for the relevant 21 pixels is taken in dependence upon the sum supplied by the summing members 61 and 62. The evaluation unit 63 declares the relevant post-filtered displacement vector only valid when three conditions have been fulfilled. The sum supplied by the summing member 62 must be larger than 10 and it must be larger than the sum supplied by the summing member 61. Moreover, the post-filtered candidate vector $v_{xc}$ should have a value of more than 2. Only when these three conditions are fulfilled does the evaluation unit 63 supply a corresponding validity signal which is applied to a multiplexer 64.

The decisions taken by the evaluation unit 63 cause the decision taken for the single pixel whether the post-filtered candidate vector $v_{xc}$ is valid or not valid to be taken in dependence upon the detection results of the 20 adjacent pixels, which results are supplied by the detectors 45 and 46. The evaluation unit 63 only supplies a validity signal if the post-filtered candidate vector actually indicates a movement for the majority of these pixels and if this movement has been determined for the majority of these pixels more frequently than no movement.

During the periods when the evaluation unit 63 declares the post-filtered candidate vector to be valid, this candidate vector, which is available at the output 38 of the median filter 37 of the filter circuit 3, will appear at the output 65 of the multiplexer 64. During the other periods the value zero appears at the output 65 of the multiplexer 64. This signal which is available at the output 65 of the multiplexer 64 is now the signal which detects a possible horizontal movement in the picture contents and which indicates the magnitude of this movement.

Figure 2:
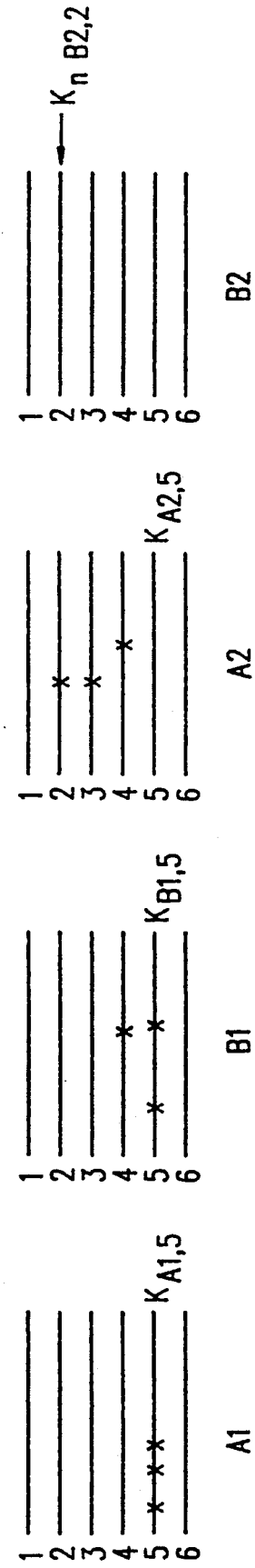
FIG. 2 is a diagrammatic representation of a plurality of successive fields to explain the operation of gaining the displacement and candidate vectors.

FIG. 2 shows diagrammatically four successive fields to explain the operation of the arrangement of FIG. 1. With reference to this diagram the mode of determining the displacement vectors, the candidate vectors and the post-filtered candidate vector will be further explained.

For the sake of simplicity the fields in accordance with FIG. 2 only have six lines. Fields A1 and B1 form a first frame and fields A2 and B2 form a second frame.

In the field A1 the determination of the displacement vectors and the candidate vector is shown by way of example for the scanning line 5. This process shown for the scanning line 5 of course also applies in a corresponding manner to all other scanning lines 1 to 6, but in FIG. 2 the determination of these vectors has been indicated for scanning line 5 for the sake of clarity.

At the end of a scanning line, for example, the scanning line 5 of the field A1 a candidate vector is formed from the three displacement vectors last determined in time. In the representation according to FIG. 2 this is the case in the field A1 for three displacement vectors which were determined in the scanning line 5 and whose instant of determination is diagrammatically marked by means of a cross in the Figure. At the end of scanning line 5 of the field A1 the candidate vector $K_{A1,5}$ is determined. This candidate vector $K_{A1,5}$ is filtered from the three displacement vectors by means of median filtering.

In the field B1 a candidate vector $K_{B1,5}$ is also determined at the end of the scanning line 5. This vector is of course also formed from the three last-determined displacement vectors. Since in the exemplary case chosen for the field B1 in FIG. 2 only two displacement vectors were determined in the scanning line 5 of this field, the displacement vector which was the last to be determined in the scanning line 4 is also utilized for forming the candidate vector $K_{B1,5}$.

Also in the field A2 following the field B1 the candidate vector $K_{A2,5}$ is filtered from the last-determined three displacement vectors at the end of the scanning line 5. In the exemplary case chosen in FIG. 2 for the field A2 no displacement vector was determined in the scanning line 5 and only one displacement vector was determined in the scanning lines 4, 3 and 2. For determining the candidate vector $K_{A2,5}$ at the end of the scanning line 5 these three displacement vectors determined in the scanning lines 2, 3 and 4 represent the three last-determined displacement vectors so that the candidate vector $K_{A2,5}$ is formed from these displacement vectors.

In the arrangement according to FIG. 1, more specifically in the filter circuit 3, a post-filtered candidate vector is gained from these three candidate vectors $K_{A1,5}$, $K_{B1,5}$ and $K_{A2,5}$, which post-filtered candidate vector is, however, utilized for the first time in the field B2 according to FIG. 2 which follows the field A2. The post-filtered candidate vector is thus only utilized in the field which follows the last field in which the last of the three candidate vectors utilized for gaining the post-filtered candidate vector was determined.

In the field B2 this post-filtered candidate vector $K_{nB2,2}$ is, however, not utilized for the scanning line 5 at whose end the candidate vectors were determined in the previous fields. The post-filtered candidate vector $K_{nB2,2}$ is utilized for three lines beforehand, thus for the scanning line 2. For the pixels of this line it is checked in the circuit 4 whether there is a movement in accordance with this post-filtered candidate vector $K_{nB2,2}$ or whether there is no movement. Utilization of this post-filtered candidate vector $K_{nB2,2}$ for three lines before those scanning lines from which the candidate vectors were gained and which were utilized for gaining the post-filtered candidate vector has the advantage that possible upper object boundaries detected with a certain delay but most likely occurring also in previous scanning lines can already be taken into account, i.e. a movement of detected edges can already be checked.

I claim:

1. A method of detecting horizontal movements in the picture contents of time-sequential frames or fields composed of scanning lines of a picture signal, comprising the steps of:

detecting edges in the scanning lines by comparing the pixel values of successive pixels, and determining a displacement vector indicating the horizontal displacement of the edge for each detected edge by comparing the location of the detected edges in successive frames or fields.

2. A method as claimed in claim 1, wherein the validity of each displacement vector is checked by adding the values of eight pixels which are located in the two frames or fields behind the detected edge and by comparing the values of the two sums.

3. A method as claimed in claim 1, wherein for the pixel-by-pixel check whether there is a movement in accordance with the possibly post-filtered candidate vector(s) a threshold value is used whose value, which may not be exceeded during the comparison, is varied in dependence upon the vertical and horizontal spatial frequencies of the picture contents of the television signal, the threshold value increasing as the spatial frequency is higher.

4. A method as claimed in claim 1, wherein for a television signal which has fields generated in accordance with the interlaced scanning mode, characterized in that a vertical filtering, preferably a median filtering is performed in one of two successive fields before detection of the movement.

5. A method as claimed in claim 1, wherein the picture signal is a digital picture signal which comprises luminance and chrominance components and in that only the luminance signal component is utilized for the method.

6. An arrangement for performing the method as claimed in claim 1, comprising: means for comparing the pixel values of successive pixels, an edge detector and means for detecting the position of the edges in the successive frames or fields and determining a displacement vector for each detected edge.

7. A method as claimed in claim 1, wherein the pixel values of successive pixels in the scanning lines for detecting the edges are compared by subtracting the pixel values, an edge being only detected when this difference exceeds threshold value varied in dependence upon the modulation depth of the television signal.

8. A method as claimed in claim 7, wherein the threshold value has half the value of the maximum pixel value of the previous scanning line.

9. A method as claimed in claim 7, wherein the edge is recognized in the same line of the subsequent frame or field only when the difference value determined for this edge deviates by a maximum value of ¼ of the maximum pixel value of the previous scanning line from the difference value determined for the edge in the same scanning line for the other frame or field.

10. A method as claimed in claim 1, wherein the check to be carried out for each pixel of a scanning line of a frame or field on whether there is a movement in accordance with one or more candidate vectors or whether there is no movement of the pixels by comparing the value of the pixel with the value of the pixel displaced by the candidate vector and of the pixel having the same location of the subsequent frame or field, is realised in such a way that the results of the check for a predeterminable number of pixels, half of which are located before and half of which is located after the pixel to be checked on its movement in the scanning line, are separately added for both checks and in that the decision whether the possibly post-filtered candidate vector is valid or not valid for the checked pixel is taken in dependence upon the value of this sum.

11. A method as claimed in claim 10, wherein the candidate vector for the checked pixel is only valid when a movement in accordance with the candidate vector is more frequently determined for the predeterminable number of pixels than no movement.

12. A method as claimed in claim 10, wherein the candidate vector for the checked pixel is only valid when a movement in accordance with the candidate vector was determined for at least half the predeterminable number of checked pixels.

13. A method as claimed in claim 10, wherein the candidate vector for the checked pixel is only valid when the candidate vector itself exceeds a predeterminable minimum value, the minimum value being preferably equal to a movement of two pixels per frame or field.

14. A method as claimed in claim 10, wherein the predeterminable number of pixels is larger than 7 and smaller than 25.

15. A method as claimed in claim 1, comprising the further steps of:
checking the validity of each displacement vector by comparing the pixel values of a plurality of pixels located behind the associated edge,
filtering a candidate vector from a plurality of successive displacement vectors for which said check has yielded a positive result, and
separately checking for each pixel of a scanning line of a frame or a field it is separately checked whether there is a movement in accordance with one or a plurality of candidate vectors or whether there is no movement of the pixel by comparing the value of the pixel with the value of the pixel displaced by the candidate vector and the value of the pixel having the same position in the subsequent frame or field.

16. A method as claimed in claim 15, comprising the further the steps of subjecting the candidate vectors filtered from the displacement vectors to a post-filtering treatment, a post-filtered candidate vector being filtered from the candidate vectors determined for the same scanning lines of at least two successive frames or fields.

17. A method as claimed in claim 16, comprising the further the steps of filtering for each scanning line of a frame or field exactly one candidate vector from the three last-determined displacement vectors, and subjecting this candidate vector to the post-filtering treatment.

18. A method as claimed in claim 16, wherein the filtering of the displacement vectors and/or the post-filtering of the candidate vectors is a median filtering.

19. A method as claimed in claim 16, wherein the post-filtered candidate vectors are taken from the candidate vectors of the same scanning lines of three successive frames or fields.

20. A method as claimed in claim 19, wherein the post-filtered candidate vector is used for the pixels of a scanning line to check whether there is a movement in accordance with this candidate vector or whether there is no movement, and in that this scanning line is comprised in the frame or field which time-sequentially follows the frames or fields for which the candidate vectors were determined and from which vectors the post-filtered candidate vector has resulted.

21. A method as claimed in claim 20, wherein the post-filtered candidate vector is utilized for the pixel-by-pixel check of that scanning line of the subsequent frame or field that is located three lines before the scanning lines of the previous frames or fields for which the candidate vectors were determined and from which vectors the post-filtered candidate vector has resulted.

* * * * *